(12) United States Patent
Siffer et al.

(10) Patent No.: US 9,433,971 B2
(45) Date of Patent: *Sep. 6, 2016

(54) ATMOSPHERIC PLASMA TREATMENT OF REINFORCEMENT CORDS AND USE IN RUBBER ARTICLES

(71) Applicant: The Goodyear Tire & Rubber Company, Akron, OH (US)

(72) Inventors: Frederic Gerard Auguste Siffer, Petite Rosselle (FR); James Gregory Gillick, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 586 days.

This patent is subject to a terminal disclaimer.

(21) Appl. No.: 14/021,422

(22) Filed: Sep. 9, 2013

(65) Prior Publication Data

US 2014/0099463 A1  Apr. 10, 2014

Related U.S. Application Data

(60) Provisional application No. 61/709,446, filed on Oct. 4, 2012.

(51) Int. Cl.
*B05D 1/00* (2006.01)
*B60C 9/00* (2006.01)
(Continued)

(52) U.S. Cl.
CPC . *B05D 1/62* (2013.01); *B60C 9/00* (2013.01); *D02G 3/48* (2013.01); *D07B 1/0666* (2013.01); *Y10T 428/139* (2015.01);
(Continued)

(58) Field of Classification Search
CPC ............ B60C 9/00; D02G 3/48; B05D 1/62; D07B 1/0666; Y10T 428/249921; Y10T 428/139; Y10T 428/294; Y10T 428/2964
See application file for complete search history.

(56) References Cited

U.S. PATENT DOCUMENTS

| 3,817,778 A | 6/1974 | Wright |
| 3,835,082 A | 9/1974 | Wright |

(Continued)

FOREIGN PATENT DOCUMENTS

| CN | 1302257 A | 7/2001 |
| CN | 1468154 A | 1/2004 |

(Continued)

OTHER PUBLICATIONS

Kang, H.M., et al., Surface Modification of Steel Tire Cords via Plasma Etching and Plasma Polymer Coating: Part 1 Adhesive Properties, Adhesive Properties, Mar. 22, 2000, 53-62, 35, Elastomer Seoul.

(Continued)

*Primary Examiner* — Robert S Walters, Jr.
(74) *Attorney, Agent, or Firm* — John D. DeLong

(57) ABSTRACT

The present invention is directed to a method of treating a reinforcement cord, comprising the steps of
(A) atomizing a mixture of at least one hydrocarbon sulfide, a low viscosity organic solvent, and a carrier gas to form an atomized mixture;
(B) generating an atmospheric pressure plasma from the atomized mixture; and
(C) exposing the reinforcement cord to the atmospheric pressure plasma under conditions suitable to form a polymer strongly bonded to the reinforcement cord and capable of bonding to rubber.

13 Claims, 1 Drawing Sheet

(51) Int. Cl.
*D02G 3/48* (2006.01)
*D07B 1/06* (2006.01)

(52) U.S. Cl.
CPC .. *Y10T 428/249921* (2015.04); *Y10T 428/294* (2015.01); *Y10T 428/2964* (2015.01)

(56) References Cited

U.S. PATENT DOCUMENTS

| | | |
|---|---|---|
| 4,269,250 A | 5/1981 | Harrison |
| 4,284,543 A | 8/1981 | Hollis |
| 4,421,899 A | 12/1983 | Yamazaki et al. |
| 4,436,853 A | 3/1984 | Schloman, Jr. |
| 4,606,930 A | 8/1986 | Ueno et al. |
| 4,636,435 A | 1/1987 | Yanagihara et al. |
| 4,693,927 A | 9/1987 | Nishikawa et al. |
| 4,804,436 A | 2/1989 | Debroche et al. |
| 4,850,412 A | 7/1989 | Gupta |
| 4,906,680 A | 3/1990 | Umeda et al. |
| 5,041,304 A | 8/1991 | Kusano et al. |
| 5,053,246 A | 10/1991 | Shuttleworth et al. |
| 5,283,119 A | 2/1994 | Shuttleworth et al. |
| 5,284,543 A | 2/1994 | Kusano et al. |
| 5,290,378 A | 3/1994 | Kusano et al. |
| 5,365,988 A | 11/1994 | Soderberg et al. |
| 5,376,413 A | 12/1994 | Callebert et al. |
| 5,399,832 A | 3/1995 | Tanisaki et al. |
| 5,414,324 A | 5/1995 | Roth et al. |
| 5,501,880 A | 3/1996 | Parker et al. |
| 5,878,564 A | 3/1999 | De Vos et al. |
| 6,096,156 A | 8/2000 | Morin et al. |
| 6,120,911 A | 9/2000 | Beers et al. |
| 6,425,426 B1 | 7/2002 | Osborne et al. |
| 6,436,481 B1 | 8/2002 | Chabrecek et al. |
| 6,497,954 B1 | 12/2002 | Morin et al. |
| 6,533,008 B1 | 3/2003 | Lickes et al. |
| 6,610,068 B1 | 8/2003 | Yang |
| 6,613,394 B2 | 9/2003 | Kuckertz et al. |
| 6,664,737 B1 | 12/2003 | Berry et al. |
| 6,774,018 B2 | 8/2004 | Mikhael et al. |
| 6,886,320 B2 | 5/2005 | Rowan |
| 6,896,932 B2 | 5/2005 | Huang et al. |
| 6,966,351 B2 | 11/2005 | Scarpitti |
| 6,988,520 B2 | 1/2006 | Watkins et al. |
| 7,252,129 B2 | 8/2007 | Michiels et al. |
| 7,259,199 B2 | 8/2007 | Sandstrom |
| 7,353,852 B2 | 4/2008 | Hitotsuyanagi et al. |
| 7,455,892 B2 | 11/2008 | Goodwin et al. |
| 7,517,561 B2 | 4/2009 | Haack et al. |
| 7,557,019 B2 | 7/2009 | Mikhael et al. |
| 7,614,436 B2 | 11/2009 | Michiels et al. |
| 8,053,510 B2 | 11/2011 | Sandstrom et al. |
| 8,445,074 B2 | 5/2013 | Siffer et al. |
| 2002/0185206 A1 | 12/2002 | Pereira et al. |
| 2003/0068449 A1 | 4/2003 | Steinberg et al. |
| 2003/0100703 A1* | 5/2003 | Hahn ............... C07C 319/24 528/373 |
| 2004/0022945 A1 | 2/2004 | Goodwin et al. |
| 2004/0159382 A1 | 8/2004 | Armellin et al. |
| 2007/0093076 A1 | 4/2007 | Mikhael et al. |
| 2007/0202270 A1 | 8/2007 | Rose et al. |
| 2007/0256770 A1 | 11/2007 | Segawa et al. |
| 2009/0133923 A1 | 5/2009 | Kotsubo et al. |
| 2009/0238989 A1 | 9/2009 | Dadheech et al. |
| 2010/0084348 A1 | 4/2010 | Munn |
| 2011/0121107 A1 | 5/2011 | Siffer et al. |
| 2011/0121108 A1 | 5/2011 | Rodewald et al. |
| 2011/0241269 A1 | 10/2011 | Siffer et al. |
| 2011/0244139 A1 | 10/2011 | Siffer et al. |
| 2012/0067485 A1 | 3/2012 | Imhoff et al. |

FOREIGN PATENT DOCUMENTS

| | | |
|---|---|---|
| CN | 101096820 A | 1/2008 |
| CN | 102212963 A | 10/2011 |
| EP | 0346055 A2 | 12/1989 |
| EP | 0901914 A1 | 3/1999 |
| EP | 1302503 A2 | 4/2003 |
| EP | 1726615 A1 | 11/2006 |
| EP | 2371882 A1 | 10/2011 |
| JP | S59179632 A | 10/1984 |
| JP | 2004360113 A | 12/2004 |
| JP | 2009275303 A | 11/2009 |
| WO | WO0228548 A2 | 4/2002 |
| WO | WO03086031 A1 | 10/2003 |
| WO | WO2006048649 A1 | 5/2006 |
| WO | WO2006135347 A1 | 12/2006 |
| WO | WO2008057759 A2 | 5/2008 |
| WO | WO2008060522 A2 | 5/2008 |

OTHER PUBLICATIONS

Kang, H.M., et al., Surface Modification of Steel Tire Cords via Plasma Etching and Plasma Polymerization Coating: Part II. Characterization, Characterization, Mar. 22, 2000, Elastomer Seoul.
Kang, H.M., et al., ThomsonXP-002655343, No date, No volume number.
EPO Search Report dated Jan. 27, 2014.
Delattre, J.L., Plasma-polymerized thiophene films for enhanced rubber-steel bonding Applied Surface Science, vol. 252, Issue 10, Mar. 15, 2006, pp. 3912-3919.
HRJ-11995. [Online] Available: http://siigroup.com/productinfo.asp?ID=99.
Hercolyn® D. [Online] Available: http:www.pinovasolutions.com.
SP-1056. [Online] Available: http://siigroup.com/productinfo.asp?ID=126.
Staybelite® Ester 10. [Online] Available: http://www.pinovasolutions.com.
TPS 37™ LS. Online] Available: http://www.arkema-inc.com/tds/1000.pdf.

* cited by examiner

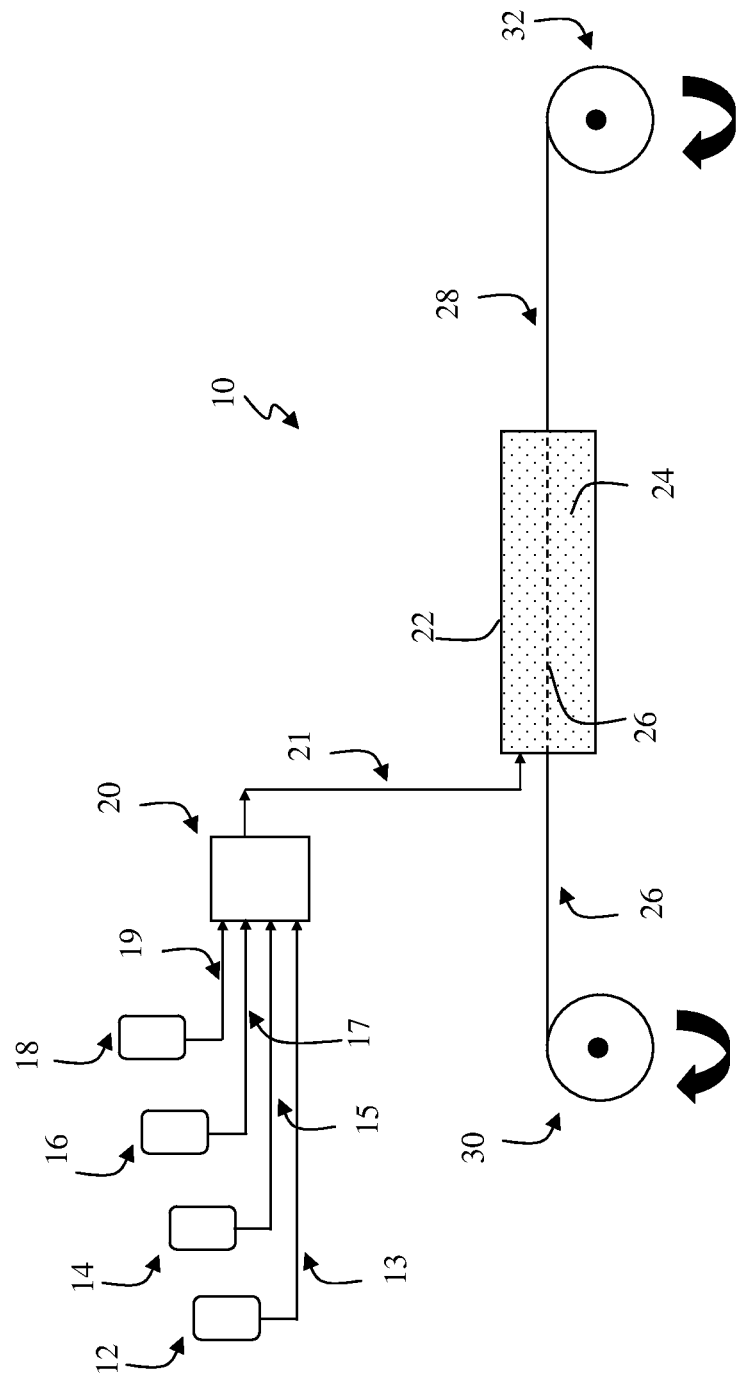

ATMOSPHERIC PLASMA TREATMENT OF REINFORCEMENT CORDS AND USE IN RUBBER ARTICLES

BACKGROUND

Rubber is typically reinforced with various embodiments of textile, glass or steel fibers to provide basic strength, shape, stability, and resistance to bruises, fatigue, and heat. These fibers may be twisted into plies and cabled into cords. Rubber tires of various construction as well as various industrial products such as belts, hoses, seals, bumpers, mountings, and diaphragms can be prepared using such cords.

Manufacturers of rubber reinforced articles have long realized the importance of the interfacial adhesion of reinforcement of its rubber environment. Specialized coatings such are resorcinol/formaldehyde latex adhesives for polymeric cords and brass plating for steel cords are typically applied to fiber and wire reinforcements to enable them to function effectively for tire use. In addition, the compounds used to coat these reinforcements are usually specially formulated to develop adhesion. For example, many tire manufacturers use various cobalt salts as bonding promoters in their steel cord wire coats, as well as using relatively high ratios of sulfur to cure accelerator. The bonding promoters are added through compounding. To achieve a maximum bonding strength, an excess amount of cobalt salt is often added to the wire coat. Since only a very small portion of the cobalt salt may be engaged in the rubber-metal interfacial bonding reaction, most of the cobalt salts remained in the compound as excess cobalt without any contribution to the bonding. Cobalt is expensive and may even cause aging problems of the rubber when used in excess, as well as having objectionable environmental effects.

It continuously remains desirable to improve adhesion of reinforcement cords to rubber while simultaneously improving the properties of the coat compounds and reducing their cost.

SUMMARY OF THE INVENTION

The present invention is directed to a method of treating a reinforcement cord, comprising the steps of
(A) atomizing a mixture of at least one hydrocarbon sulfide, a low viscosity organic solvent, and a carrier gas to form an atomized mixture;
(B) generating an atmospheric pressure plasma from the atomized mixture; and
(C) exposing the reinforcement cord to the atmospheric pressure plasma under conditions suitable to form a polymer strongly bonded to the reinforcement cord and capable of bonding to rubber.

BRIEF DESCRIPTION OF THE DRAWINGS

FIG. 1 is a schematic representation of one embodiment of the present invention.

DETAILED DESCRIPTION OF THE INVENTION

There is disclosed a method of treating a reinforcement cord, comprising the steps of
(A) atomizing a mixture of at least one hydrocarbon sulfide, a low viscosity organic solvent, and a carrier gas to form an atomized mixture;
(B) generating an atmospheric pressure plasma from the atomized mixture; and
(C) exposing the reinforcement cord to the atmospheric pressure plasma under conditions suitable to form a polymer strongly bonded to the reinforcement cord and capable of bonding to rubber.

With reference now to the drawing, one embodiment of a method of treating a reinforcement cord according to the present invention is illustrated. In the process 10, carrier gas 13 is fed from storage vessel 12 to atomizer 20 along with monomer 15 from storage vessel 14, halogenated saturated hydrocarbon 17 from storage vessel 16. Optionally, one or more curatives 19 may be added from storage vessel 18. Carrier gas 13, monomer 15, halogenated saturated hydrocarbon 17 and optional curative 19 are atomized in atomizer 20 to form atomized mixture 21. Atomized mixture 21 is sent to plasma generator 22, where atmospheric plasma 24 is generated from atomized mixture 21. Reinforcement cord 26 is unwound from spool 30 and conveyed through plasma generator 22 and atmospheric plasma 24 for deposition of a surface treatment by the plasma 24. Treated reinforcement cord 28 exits plasma generator 22 and is wound onto spool 32 for storage.

The plasma generator may be any suitable plasma generation device as are known in the art to generate atmospheric pressure plasmas, such as atmospheric pressure plasma jet, atmospheric pressure microwave glow discharge, atmospheric pressure glow discharge, and atmospheric dielectric barrier discharge. In one embodiment, the plasma generator is of the dielectric barrier discharge type. The dielectric barrier discharge apparatus generally includes two electrodes with a dielectric-insulating layer disposed between the electrodes and operate at about atmospheric pressures. The dielectric barrier discharge apparatus does not provide one single plasma discharge, but instead provides a series of short-lived, self terminating arcs, which on a long time scale (greater than a microsecond), appears as a stable, continuous, and homogeneous plasma. The dielectric layer serves to ensure termination of the arc. Further reference may be made to U.S. Pat. No. 6,664,737 for its teaching regarding the operation of a dielectric barrier discharge apparatus.

By atmospheric pressure plasma, it is meant that the pressure of the plasma is equal to or slightly above the ambient pressure of the surroundings. The pressure of the plasma may be somewhat higher than ambient, such that the plasma pressure is sufficient to induce the desired flow rate through the atomizer and plasma generator.

The atomized mixture includes a carrier gas, at least one monomer, and a low viscosity organic solvent. When metallic reinforcements are used, the organic solvent is preferentially a halogenated hydrocarbon. Chlorine is the preferred halogen for this use.

Suitable carrier gas includes any of the noble gases including helium, argon, xenon, and neon. Also suitable as carrier gas are nitrogen, carbon dioxide, nitrous oxide, carbon monoxide, and air. In one embodiment, the carrier gas is argon.

The hydrocarbon sulfide includes sulfur olefins and polysulfide compounds represented by the general formula (2).

$$R^1\text{—}S_x\text{—}R^2 \qquad (2)$$

where $R^1$ and $R^2$ are univalent hydrocarbon groups, which may be the same or different, and x is an integer of 2 or more.

In one embodiment, $R^1$ and $R^2$ may be straight-chain or branched saturated or unsaturated aliphatic hydrocarbon groups of 2 to 20 carbon atoms (e.g. alkyl groups or alkenyl groups), or aromatic hydrocarbon groups of 6 to 26 carbon atoms, such as an ethyl group, propyl group, butyl group, nonyl group, dodecyl group, propenyl group, butenyl group, benzyl group, phenyl group, tolyl group, or hexyl phenyl group.

Specific examples of these that may be given include sulfur diisobutyl disulfide, dioctyl polysulfide, di-tertiary nonyl polysulfide, di-tertiary butyl polysulfide, di-tertiary benzyl polysulfide, di-tertiary-dodecyl polysulfide, or olefin sulfides obtained by sulfurizing with a sulfurizing agent olefins such as poly-isobutylene or terpene.

The amount of hydrocarbon sulfide may be expressed as a percent of the total components in the atomized mixture excluding the carrier gas, i.e., on a carrier gas free basis. In one embodiment, the amount of monomer ranges from 10 to 90 percent by weight of the total components in the atomized mixture on a carrier gas free basis. In one embodiment, the amount of hydrocarbon sulfide ranges from 20 to 50 percent by weight of the total components in the atomized mixture on a carrier gas free basis.

The atomized mixture includes a low viscosity organic solvent. By low viscosity solvent, it is meant that the solvent is of suitable viscosity to allow efficient atomization of the low viscosity organic solvent in a nebulizer or the like. In one embodiment, the low viscosity organic solvent is a substituted or unsubstituted organic solvent with one to ten carbon atoms. In one embodiment, the low viscosity organic solvent is capable of being atomized to a particle size of no more than 10 micrometers. In one embodiment, the low viscosity organic solvent is capable of being atomized to a particle size of no more than 30 micrometers. In one embodiment, the low viscosity organic solvent is capable of being atomized to a particle size of no more than 50 micrometers.

Suitable low viscosity organic solvents include hydrocarbons such as pentane, hexane, and toluene, ethers such as diethyl ether and tetrahydrofuran, alcohols such as methanol and ethanol, and various halogenated hydrocarbons. Suitable halogenated hydrocarbons include for example dichloromethane (methylene chloride), trichloromethane (chloroform), carbon tetrachloride, trichloroethane, chlorobutane, methyl chloride, allyl chloride, 1,2 dichloropropane, 2-chloro-2-methylpropane, and 1-chloro-2-methylpropane. The amount of low viscosity organic solvent may be expressed as a percent of the total components in the atomized mixture with the exception of the carrier gas, i.e., on a carrier gas free basis. In one embodiment in which a halogenated hydrocarbon is used, the amount of halogenated hydrocarbon ranges from 90 to 10 percent by weight of the total components in the atomized mixture on a carrier gas free basis. In one embodiment, the amount of halogenated saturated hydrocarbon ranges from 80 to 50 percent by weight of the total components in the atomized mixture on a carrier gas free basis.

As an alternative to a halogenated hydrocarbon, a non-halogenated low viscosity organic solvent may be used in combination with a suitable amount of chlorine gas, methyl chloride gas, or other suitable gaseous halogenated compound that is included in the atomized mixture or by direct addition to the plasma.

Optionally, the atomized mixture may include at least one curative, such as sulfur donors and accelerators. Alternatively, curatives may be absent from the material deposited on the reinforcement cord from the atmospheric plasma. In this case, curatives present in a rubber composition contacted with the reinforcement cord may serve to cure the deposited material via migration of the curatives from the rubber composition to the material deposited on the cord prior to cure. When used in the atomized mixture, curatives may be present in an amount ranging from 0.5 to 2 percent by weight on a carrier gas free basis.

The reinforcement cord is constructed of any of the various reinforcement materials commonly used in tires. In one embodiment, the reinforcement cord includes steel and polymeric cords. Polymeric cords may include any of the various textile cords as are known in the art, including but not limited to cords constructed from polyamide, polyester, polyketone, rayon, and polyaramid.

The reinforcement cord is exposed to the atmospheric plasma for a time sufficient to deposit an adhesively effect amount of polymerized or partially polymerized monomer onto the cord surface. By adhesively effective amount, it is meant that the treated cord will show increased adhesion to a cured rubber compound as measured by a standard adhesion test, such as ASTM Standard D2229-73. Generally, the exposure time required will depend on the concentration of monomer in the atomized mixture, the flow rate of atomized mixture into the plasma generator, and the power input to the plasma generator. For a batch process wherein stationary cord is exposed to an atmospheric plasma, the cord is exposed for from 1 to 100 seconds. In a continuous process, the exposure time may be characterized by a residence time expressed as the cord path length (e.g., in centimeters) through the plasma generator divided by the cord transit rate (e.g., in cm/sec). The residence time in such a continuous process would then range from 1 to 100 seconds.

The flow rate of atomized mixture into the plasma generator necessary to obtain an adhesively effective amount of polymerized or partially polymerized monomer onto the cord surface will depend on the desired face velocity in the plasma generator, i.e., the gas velocity (e.g., in cm/sec) passing perpendicular to a characteristic internal cross-sectional area of the plasma generator. Necessary flow rate may be determined by one skilled in the art without undue experimentation.

The atmospheric pressure plasma treated cord is generally used in a component of a pneumatic tire. The treated cord is calendered or otherwise contacted with a rubber composition to form the tire component using procedures as are known in the art. In various embodiments, the tire component may be a belt, carcass, apex, bead, chipper, flipper, or any other component including a cord reinforcement as are known in the art. In one embodiment, the tire component is a steel belt wherein treated steel tire cords are calendared into a rubber composition. In one embodiment, the tire component is a tire carcass wherein polymeric tire cords are contacted with a plycoat rubber composition.

It is readily understood by those having skill in the art that the rubber compositions used in tire components would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

The rubber compound may contain various conventional rubber additives. In one embodiment, the addition of carbon black comprises about 10 to 200 parts by weight of diene rubber (phr). In another embodiment, from about 20 to about 100 phr of carbon black is used.

A number of commercially available carbon blacks may be used. Included in, but not limited to, the list of carbon blacks are those known under the ASTM designations N299, N315, N326, N330, N332, N339, N343, N347, N351, N358, N375, N539, N550 and N582. Such processing aids may be present and can include, for example, aromatic, naphthenic, and/or paraffinic processing oils. Typical amounts of tackifying resins, such as phenolic tackifiers, range from 1 to 3 phr. Silica, if used, may be used in an amount of about 5 to about 100 phr, often with a silica coupling agent. Representative silicas may be, for example, hydrated amorphous silicas. Typical amounts of antioxidants comprise about 1 to about 5 phr. Representative antioxidants may be, for example, diphenyl-p-phenylenediamine, polymerized 1,2-dihydro-2,2,4-trimethylquinoline and others, such as, for example, those disclosed in the *Vanderbilt Rubber Handbook* (1990), Pages 343 through 362. Typical amounts of antiozonants comprise about 1 to about 5 phr. Representative antiozonants may be, for example, those disclosed in the *Vanderbilt Rubber Handbook* (1990), Pages 363 through 367. Typical amounts of fatty acids, if used, which can include stearic acid comprise about 0.5 to about 3 phr. Typical amounts of zinc oxide comprise about 2 to about 10 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include insoluble sulfur, elemental sulfur (free sulfur) or sulfur donating vulcanizing agents, for example, an amine disulfide, polymeric polysulfide or sulfur olefin adducts. In one embodiment, the sulfur vulcanizing agent is elemental sulfur. In one embodiment, sulfur vulcanizing agents are used in an amount ranging from about 0.5 to about 8 phr. In another embodiment about 3 to about 5 phr of sulfur vulcanizing agents are used.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to about 2.5 phr. In another embodiment, combinations of two or more accelerators may be used, including a primary accelerator which is generally used in the larger amount (0.5 to 2.0 phr), and a secondary accelerator which is generally used in smaller amounts (0.05 to 0.50 phr) in order to activate and to improve the properties of the vulcanizate. Combinations of these accelerators have been known to produce a synergistic effect of the final properties and are somewhat better than those produced by use of either accelerator alone. In addition, delayed action accelerators may be used which are not affected by normal processing temperatures but produce satisfactory cures at ordinary vulcanization temperatures. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. In another embodiment, if a second accelerator is used, the secondary accelerator may be a guanidine, dithiocarbamate, thiuram, or a second sulfenamide.

The rubber compound may contain any of the cobalt materials known in the art to further promote the adhesion of rubber to metal in the case of the use of steel reinforcement cords. One advantage of the present invention is the reduction and possible elimination of cobalt compounds. However, it may be desirable to have some amounts that are present. Thus, suitable cobalt materials which may be employed include cobalt salts of fatty acids such as stearic, palmitic, oleic, linoleic and the like; cobalt salts of aliphatic or alicyclic carboxylic acids having from 6 to 30 carbon atoms, such as cobalt neodecanoate; cobalt chloride, cobalt naphthenate; cobalt carboxylate and an organo-cobalt-boron complex commercially available under the designation Manobond C from Wyrough and Loser, Inc, Trenton, N.J. Manobond C is believed to have the structure:

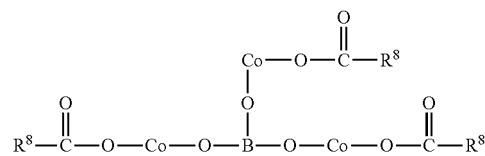

in which $R^8$ is an alkyl group having from 9 to 12 carbon atoms.

Amounts of cobalt compound which may be employed depend upon the specific nature of the cobalt material selected, particularly the amount of cobalt metal present in the compound.

In one embodiment, the amount of the cobalt material may range from about 0.2 to 5 phr. In another embodiment, the amount of cobalt compound may range from about 0.5 to 3 phr. In one embodiment, the amount of cobalt material present in the stock composition is sufficient to provide from about 0.01 percent to about 0.50 percent by weight of cobalt metal based upon total weight of the rubber stock composition. In another embodiment, the amount of cobalt material present in the stock composition is sufficient to provide from about 0.03 percent to about 0.2 percent by weight of cobalt metal based on total weight of wire coat composition.

In the case of polymeric reinforcement cords, the atmospheric pressure plasma treated cord may be further treated with one or more of RFL (resorcinol-formaldehyde-latex), isocyanate or epoxide type dips. Such dips are well known to those skilled in the art.

The tire containing the tire component can be built, shaped, molded and cured by various methods which will be readily apparent to those having skill in such art.

The prepared tire of this invention is conventionally shaped and cured by methods known to those having skill in such art.

While the invention as described herein has been directed to reinforcement cords and tires, the method is not so limited. Other applications of reinforcement cords, which includes tire cords, as treated by the methods described herein can be envisioned. Any rubber or elastomer article of manufacture reinforced with reinforcement cords can utilize cords as treated by the methods described herein. For example, applications of the treated reinforcement cords using the plasma methods described herein include reinforced hoses, transmission belts, drive belts, air springs, conveyor belts, drive tracks, and the like. Thus, the methods as described herein as suitable for treatment of tire cords are equally applicable to the treatment of any reinforcement cord as used in reinforced rubber or elastomer articles of manufacture. Such reinforcement cords may be in the form of individual cords or as a fabric.

The invention is further described with reference to the following examples.

Example 1

In this example, the effect of plasma treatment with a hydrocarbon sulfide (di-t-nonylpolysulfide, from Arkema) on the adhesion of metal to rubber is illustrated. Galvanized steel coupons were treated with an atmospheric argon plasma in a Plasmatreater 400 AS from Plasmatreat US LP, Elgin, Ill. The plasma was generated using a ionization argon gas flow rate of 800 L/hour, a plasma frequency of 25 kHz, duty cycle of 42%, torch velocity of 10 m/min, a torch/raster offset of 1 mm, a treatment number of 1, and a nozzle height of 5 mm.

Hot-dip galvanized steel coupons (1 inch×5 inches) were cleaned by sandblasting to remove surface layer chemical species to expose essentially pure metal surfaces, followed by an ultrasonic bath in acetone and air drying. Cleaned galvanized steel coupons were exposed to an atmospheric plasma generated from a nebulized gas mixture of various compositions as given in Table 1. The liquid species were nebulized into argon gas (0.8 L/min) using an ultrasonic nebulizer from Sonaer Ultrasonics (Model 241PG, frequency—2.4 MHz, ultrasonic power—12-15 watts) operated at 65% of the ultrasonic power. The nebulized mixture as then mixed with the ionization argon gas stream to form the final plasma.

Adhesion of plasma treated galvanized steel coupons to rubber was tested with a lap shear test. Each lap shear specimen was made by interposing a mylar sheet with a precut window of 15 mm by 25 mm between a plasma treated galvanized steel coupon and an uncured wirecoat rubber compound sheet, thus defining the contact area as the dimensions of the window. The galvanized steel coupon was offset from the rubber sheet an amount sufficient to allow grip during the lap shear test. A brass coupon identical in size to the galvanized steel coupon was then laid over the rubber sheet on the side opposite of the mylar sheet and galvanized steel coupon. The brass coupon was offset to allow grip during the lap shear test. The layered specimen was then cured in a press at 10 tons pressure for 30 minutes at 155° C. Cured specimens were tested for lap shear strength in a Instron machine using a 50 kN load cell. Results of the lap shear tests with standard deviations are given in Table 2, with all results representing the average of at least four duplicate samples.

An additional control sample 5 using a brass coupon in place of the galvanized steel coupon was prepared and tested for lap shear.

As seen in Tables 1 and 2, the presence of the di-t-nonylpolysulfide in the plasma treatment of the galvanized steel coupon (Sample 4) gives rubber adhesion comparable to that of the brass coupon (Sample 5), both in terms of the fracture force and fracture energy. By comparison, the galvanized steel coupon treated with a plasma including squalene (Sample 3) shows lower adhesion. The inclusion of the hydrocarbon sulfide material thus leads to superior adhesion as compared to the non-sulfur containing hydrocarbon.

TABLE 1

| Sample No. | Type | Plasma Composition (in Argon) |
|---|---|---|
| 1 | control | Ar only |
| 2 | control | 100% $CH_2Cl_2$ |
| 3 | comparative | 60 vol % $CH_2Cl_2$/40 vol % squalene |
| 4 | invention | 60 vol % $CH_2Cl_2$/40 vol % di-t-nonylpolysulfide |
| 5 | control | none |
| 6 | invention | 60 vol % allyl chloride/40 vol % di-t-nonylpolysulfide |

TABLE 2

| Sample No. | Type | Fracture Force[1], kN | Fracture Energy[2], J/m² |
|---|---|---|---|
| 1 | control | 1.23 ± 0.18 | 1013 ± 160 |
| 2 | control | 4.00 ± 0.17 | 5903 ± 999 |
| 3 | comparative | 4.93 ± 0.38 | 12827 ± 3387 |
| 4 | inventive | 5.43 ± 0.35 | 18213 ± 3387 |
| 5 | control[3] | 5.28 ± 0.25 | 18960 ± 3413 |
| 6 | inventive | 4.94 ± 0.61 | 10952 ± 5307 |

[1]Fracture force is the force applied at failure of the lap shear specimen
[2]Fracture energy is obtained by integrating the area under the force vs. displacement curve as measured during Instron pull, then referenced to the mylar window dimensions
[3]Sample 5 made with a brass coupon in place of the galvanized steel coupon Standard brass-coated wire technology requires long cure times and high sulfur levels to general good adhesion between the rubber compound and the wire via interaction of copper from the brass wire and sulfur from the rubber compound to general copper sulfide. Additionally, wire coat compounds contain cobalt salts that aid in preventing the breakdown of the copper-sulfur interaction over time.

As seen in the results of the present invention, plasma coated wire technology allows the potential for the use of rubber formulations atypical of wire coat compounds that may be better for long term adhesion between the wire and rubber. The technology may also allow the elimination of cobalt salts which is beneficial from an environmental and cost standpoint. In one embodiment, then, the rubber composition in contact with the plasma treated reinforcement cord is exclusive of cobalt compounds. The technology may also allow the use of steel cord that is not brass coated, again beneficial from an environmental and cost standpoint. In one embodiment, then, the plasma treated reinforcement cord is exclusive of brass or copper.

What is claimed is:

1. A method of treating a reinforcement cord, comprising the steps of
    (A) atomizing a mixture of at least one hydrocarbon sulfide, a low viscosity organic solvent, and a carrier gas to form an atomized mixture;
    (B) generating an atmospheric pressure plasma from the atomized mixture; and
    (C) exposing the reinforcement cord to the atmospheric pressure plasma.

2. The method of claim 1, wherein the low viscosity organic solvent is a halogenated hydrocarbon.

3. The method of claim 1, wherein the low viscosity organic solvent is a non-halogenated organic solvent and a gaseous halogenated compound is added to the atomized mixture or the atmospheric pressure plasma.

4. The method of claim 1, wherein the plasma is generated by dielectric barrier discharge.

5. The method of claim 1, wherein the reinforcement cord is a steel reinforcement cord.

6. The method of claim 1, wherein the reinforcement cord is conveyed continuously during exposure to the atmospheric pressure plasma.

7. The method of claim 1, wherein the carrier gas is selected from the group consisting of argon, helium, neon, xenon, nitrogen, carbon dioxide, nitrous oxide, carbon monoxide, and air.

8. The method of claim 1, wherein the at least hydrocarbon sulfide is represented by the general formula (2).

$$R^1-S_x-R^2 \quad (2)$$

where $R^1$ and $R^2$ are univalent hydrocarbon groups, which may be the same or different, and x is an integer of 2 or more.

9. The method of claim 8, wherein $R^1$ and $R^2$ are selected from the group consisting of straight-chain or branched saturated or unsaturated aliphatic hydrocarbon groups of 2 to 20 carbon atoms and aromatic hydrocarbon groups of 6 to 26 carbon atoms.

10. The method of claim 1, wherein the hydrocarbon sulfide is selected from the group consisting of diisobutyl disulfide, dioctyl polysulfide, di-tertiary nonyl polysulfide, di-tertiary butyl polysulfide, di-tertiary benzyl polysulfide, di-tertiary-dodecyl polysulfide, and olefin sulfides.

11. The method of claim 1, wherein the low viscosity organic solvent is selected from the group consisting of dichloromethane (methylene chloride), trichloromethane (chloroform), carbon tetrachloride, trichloroethane, chlorobutane, methyl chloride, allyl chloride, 1,2 dichloropropane, 2-chloro-2-methylpropane, and 1-chloro-2-methylpropane.

12. The method of claim 1, wherein the cord is in the form of an individual cord or a fabric.

13. The method of claim 1, wherein an adhesively effective amount of material is deposited on the reinforcement cord during exposure of the reinforcement cord to the atmospheric pressure plasma.

* * * * *